Patented May 23, 1939

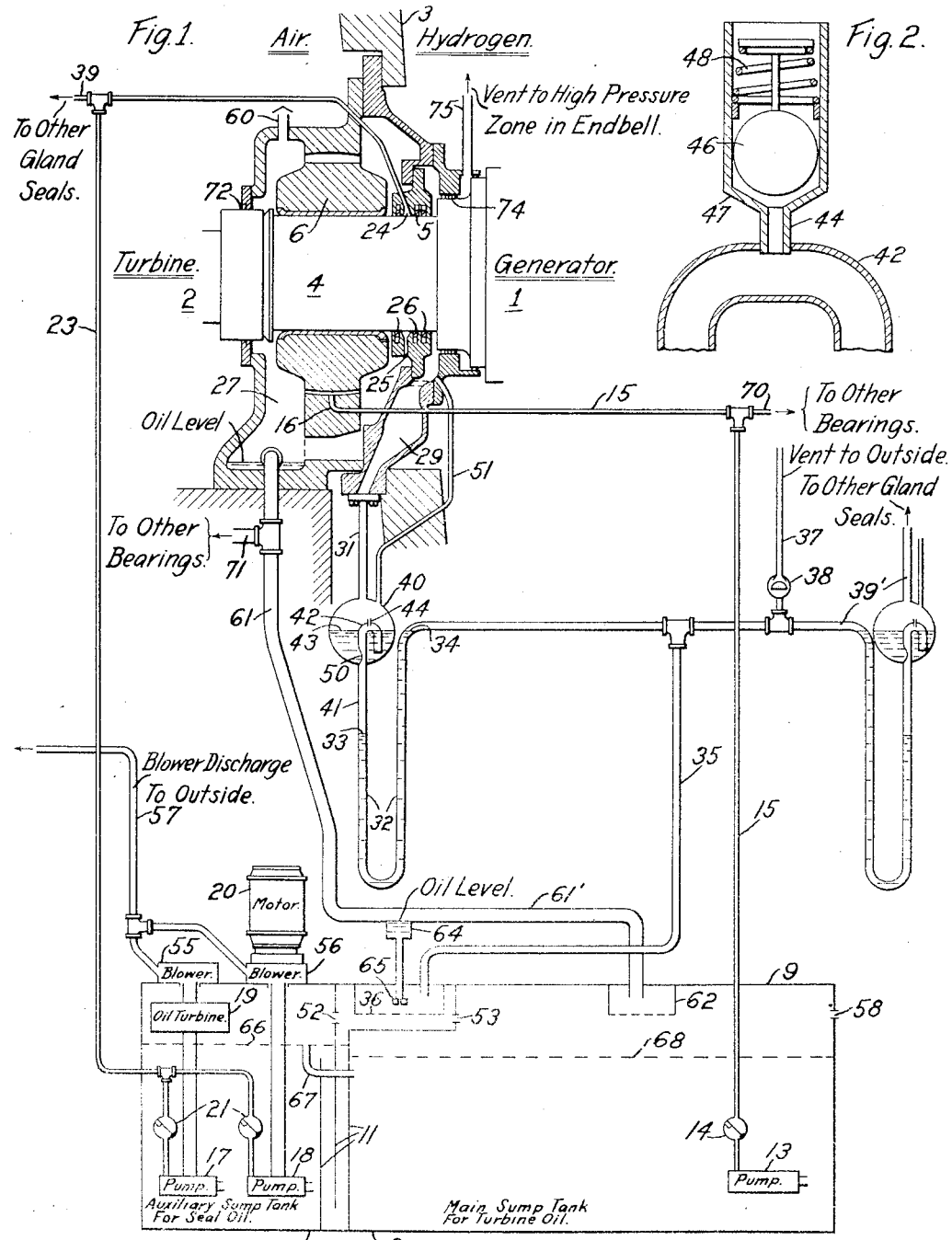

2,159,057

UNITED STATES PATENT OFFICE 2,159,057

HYDROGEN-COOLED MACHINE WITH GLAND SEALS

Charles C. Sterrett, Wilkinsburg, Pa., assignor to Westinghouse Electric & Manufacturing Company, East Pittsburgh, Pa., a corporation of Pennsylvania Application May 26, 1938, Serial No. 210,291

4 Claims. (Cl. 286—19)

The present invention relates to hydrogen-cooled dynamo-electric machines of a type having a shaft extending out of the machine housing, and having a liquid gland seal surrounding the shaft at the point where it extends through the housing.

The principal object of my invention is to provide means for preventing the loss of liquid in a liquid trap which is disposed between the overflow end of the liquid gland seal and the liquid sump tank, in the event of an explosion occurring in the hydrogen-filled generator housing.

In the accompanying drawing, Figure 1 is a diagrammatic view of apparatus illustrating a preferred form of embodiment of my invention; and Fig. 2 is an enlarged view of a detail.

In the drawing, the invention is illustrated as being utilized in connection with a hydrogen-cooled generator 1 which is driven by a turbine 2. The generator is provided with an explosion-resistant, substantially hermetically tight, hydrogen-filled housing 3, and it has a rotatable shaft 4 which extends through the housing, a gland seal 5 surrounding the shaft where it extends through the housing, and a bearing 6 on the outside portion of the shaft, that is, on the air side of the gland seal 5.

In the illustrated embodiment of the invention, the sealing liquid for the gland seal 5 is the oil which is also utilized to supply the turbine governor (not shown) and the lubricating system for the bearings of both the turbine and the generator, and this oil is stored in a common sump tank 8, the top of which is closed by a cover 9. The sump tank is preferably provided with a system of baffles 11 for dividing off one end of the tank to provide an auxiliary sump tank 12 for the seal oil, the baffles being utilized to secure sealing oil which is free of bubbles.

The lubricating system for the bearings includes a pump 13 disposed within the oil in the main portion of the sump tank 8, for supplying oil, through a check valve 14, to an oil-supply pipe 15 which supplies oil to the various bearings, as indicated at 16. Disposed in the auxiliary sump tank 12 are two other pumps 17 and 18, driven, respectively, by an oil turbine 19 and an electric motor 20, for supplying oil, through check valves 21 to an oil-feed pipe 23 which supplies oil to a central chamber 24 of the gland seal 5.

The gland seal 5 is preferably constructed in a manner which is covered by the claims of a Penney Patent No. 1,840,127, granted January 5,
1932. Its central chamber 24 is provided, at its bottom, with a bypass opening 25 for regulating the flow of seal oil to the gland seal. The bypass opening 25 discharges the seal oil into a chamber 27 disposed in the bottom of the main bearing 6. On both sides of the central chamber 24, the gland seal is provided with a baffle-system comprising rings 26 for retarding the flow of seal oil in either direction along the shaft 4. On the air side of the gland seal 5, the seal oil which flows along the shaft escapes into the chamber 27 in the bottom of the bearing 6.

On the hydrogen side of the gland seal 5, the seal oil which escapes along the shaft from the central chamber 24 discharges into a chamber 29 from which it is drained, by drainage-means 31 including an oil trap or gooseneck 32 to prevent loss of gas from the generator 1, there being a difference in oil-level 33—34 in the oil trap to compensate for the difference between the hydrogen pressure and the air pressure. The drainage system 31 drains, through a pipe 35, to the top portion of the sump tank 8, and preferably to the baffled-off end comprising the auxiliary sump tank 12, so as to insure an adequate supply of seal oil in said auxiliary sump tank. The seal oil discharged from the pipe 35 discharges first into into an oil strainer 36, from which the strained oil returns to the auxiliary sump tank 12.

The top portion of the drain pipe 35, above the highest level 34 of the oil in the oil trap 32, is normally vented to the atmosphere through a vent pipe 37, and through a normally opened check valve 38 which closes upon the occurrence of abnormal pressures resulting from an explosion.

It will be understood that other gland seals may be tapped onto the oil feed pipe 23 and the drain pipe 35, as indicated at 39 and 39', respectively.

In accordance with my invention, reliable means, independent of the danger of sticking valves, are provided for guarding against damage resulting from an explosion within the generator 1, so as to prevent said explosion from causing all of the oil to be blown out of the oil trap 32, resulting in loss of hydrogen from the generator. Although an effort is made to prevent the occurrence of explosive mixtures in the generator housing 3, if there should be such a mixture, consisting of hydrogen and air in such proportions as to be explosive, it is possible that an explosion might occur within the generator housing 3, and on this account, said housing is, for safety reasons, constructed strongly enough to withstand any gaseous pressure which might be created by such an explosion. If an explosion should occur, the product of the explosion would be water vapor, creating heavy momentary gaseous pressures, but the water vapor soon condenses into water, within a time which may be of the order of fifteen seconds, thereupon creating a condition of sub-normal pressure within the generator housing 3, which must be met by an additional supply of hydrogen, through means which do not constitute any portion of this invention and which are accordingly not illustrated, it being understood that means for maintaining the hydrogen pressure within the generator are well known in the art.

During the fifteen seconds when tremendous explosion pressures are present in the generator housing 3, the oil in the oil seal 32 would be blown into the auxiliary sump tank 12 if it were not for the adoption of special means for preventing this. In the illustrated embodiment of the invention, this means includes an intermediate oil settling tank 40 which is provided with a drainage pipe 41 having an inverted gooseneck 42 disposed within the settling tank 40 for normally determining the liquid level 43 of the liquid entrapped in said settling tank. The drainage pipe 41 empties into, and in fact constitutes a continuation of, the oil trap 32. The drainage system 31 from the chamber 29 at the hydrogen end of the gland seal 5 discharges into the top portion of the settling tank 40, so that this settling tank is disposed between the oil seal 32 and the gland seal 5.

At the top of the inverted gooseneck 42, there must be provided some sort of limited-orifice means 44 or the equivalent for normally preventing siphoning through said inverted gooseneck, but for permitting siphoning under abnormal pressure conditions. That is, when an explosive pressure exists within the generator housing 3, the hydrogen gas cannot escape fast enough through the limited-orifice means 44, to relieve the pressure, so that oil is forced from the bottom of the settling tank 40, up through the inverted gooseneck 42, and is thence discharged to the oil trap 32, to maintain oil within said oil trap.

The limited-orifice means 44 at the top of the inverted gooseneck 42 may be simply a small opening, as shown in Fig. 1, or it may be a more elaborate device, such as that which is shown in detail in Fig. 2, wherein a ball valve 46 is provided, which is normally kept off of a valve seat 47 by means of a light spring 48. When a rush of hydrogen occurs as a result of an explosive pressure condition, the ball valve 46 closes on its seat 47, thereby still further reducing the amount of hydrogen which can escape through the limited-orifice means 44. It will be understood that the illustration in Fig. 2 is greatly enlarged for the sake of clearness. It will be further understood that any limited-orifice means for the purpose described will be sufficient.

In the drainage pipe 41, immediately below the intermediate oil settling tank 40, there is provided a restricted opening or orifice 50 for limiting the rate at which oil can be discharged from the settling tank 40 under explosive-pressure conditions. The amount of oil normally entrapped in the intermediate settling tank 40 is sufficiently large, and the retarded rate of flow under explosive pressure conditions, as imposed by the orifice 50, is sufficiently slow, so that it takes longer, for all of said entrapped liquid to be discharged from the settling tank 40, than the longest possible duration of excessive pressures as a result of an explosion in the hydrogen-cooled generator 1, thus insuring that there shall always be oil in the oil trap 32.

As an added safeguard to make certain that the drainage pipe 31 does not become sealed with an accumulation of oil or oil bubbles, a bypass equalizing-pressure pipe 51 is provided between the upper portion of the settling tank 40 and the upper portion of the chamber 29 on the hydrogen side of the gland seal 5 so as to positively insure the venting of the top portion of the settling tank.

As claimed in a concurrently filed application of M. D. Ross and B. A. Rose, Serial No. 204,916, filed April 28, 1938, means are provided for sucking air through the lubricating system in such quantities as to thoroughly dilute any hydrogen which might accumulate in the piping, in the bearing housings, or in the top portions of the main and auxiliary sump tanks 8 and 12, which are in communication with each other through ventilating holes 52 and 53. The reason for this is that extremely small quantities of hydrogen may be entrapped or dissolved in the seal oil and would thus be carried into the auxiliary sump tank 12, and this hydrogen would slowly accumulate in the top portion of the tank, resulting eventually in an explosive mixture with the air in the tank. While the quantity of hydrogen thus escaping is quite unimportant from a leakage standpoint, that is, from considerations of the cost of the hydrogen, it is very important that effective means be provided for changing the air in the top portions of the main and auxiliary sump tanks 8 and 12, so that this hydrogen cannot accumulate, and it is essential that this air-changing process be maintained even during periods of shutdown of the turbine 2 and generator 1.

In the illustrated embodiment, the air-changing means takes the form of blowers 55 and 56, which are mounted on the same shafts with the pumps 17 and 18, and which serve to suck air out of the top of the auxiliary sump tank 12 and to deliver it through a discharge pipe 57 to the air outside of the building housing the turbo-generator. As previously described, the shafts of the pumps 17 and 18 on which the blowers 55 and 56 are mounted are driven, respectively, by an oil turbine 19 and an electric motor 20. The oil turbine 19 is driven by oil pressure which is created whenever the turbine is in operation, but during shutdown periods this prime mover will not be operated. Under such shutdown conditions, it is necessary that the electric motor 20 shall be energized, and this may be insured either by automatic means (not shown) for energizing the motor when the oil pressure fails in the oil turbine 19, or the motor 20 may be left energized at all times, regardless of the operation of the oil turbine.

In order to prevent any possibility of hydrogen-accumulation at the top of the main sump tank 8, the top portion of the latter may be provided with ventilating means which may take the form either of casual leakage around the edges of the cover 9, or, as shown, a definite ventilating hole 58.

As a part of the air-changing means motivated by the blowers 55 and 56, it is desirable also that air shall be sucked in through the bearing lubricating system, and to this end the upper portion of the bearing housing is vented to the air at 60, above the oil-discharge chamber 27 in the bottom of the bearing, and said oil-discharge chamber 27 is provided with a large gravity-return drainage-pipe 61 to the top portion of the main sump tank 8, where it discharges first into a strainer 62, from which the strained oil drops into the oil collected within this sump tank. The pipe 61 is large enough so that it will not be filled with oil at any time, but will have air in it as well, so that air can be sucked through said pipe 61, and through the air inlet 60 into the bearing housing.

At an intermediate point in the gravity-return pipe 61, oil is tapped off, from the bottom of a horizontal portion 61' of this pipe, by means of a connection 64 which drains down, through a restricted opening or orifice 65, into the strainer 36 which discharges into the auxiliary sump tank 12, thereby insuring an adequate supply of oil in the auxiliary sump tank 12 as indicated by the oil level 66 therein. From the auxiliary sump tank 12, oil is discharged into the main sump tank 8 through an overflow pipe 67, thus maintaining an adequate supply of oil in the main tank 8 as indicated by the oil level 68 therein. The oil-withdrawing means 64 and 65 for draining oil from the horizontal portion 61' of the gravity-return pipe 61 of the lubricating system provides a body of oil which is free of air, so that the oil which is returned to the auxiliary sump tank 12 is not foamy.

It will be understood that other bearings may be tapped onto the oil supply pipe 15 and to the oil discharge pipe 61, as indicated at 70 and 71.

The provision of means for providing an air suction through the housing of the bearing 6 has an additional advantage in keeping the oil vapor from escaping along the shaft at the point 72 on the outside of the bearing. At the same time, the discharge of the air from the top of the sump tanks 8 and 12 to the scavenging pipe 57 positively insures against the accumulation of hydrogen within the enclosed sump tanks.

In the illustrated embodiment of the invention, means are also provided for safeguarding against the entrance of seal oil from the gland seal 5 into the generator 1, said means comprising a labyrinth 74 disposed on the generator side of the chamber 29 at the hydrogen or generator side of the gland seal 5, together with a pipe 75 from the generator side of this labyrinth 74 to a high-pressure zone within the generator housing 3, so that the tendency is for hydrogen to flow past the labyrinth 74 toward the gland seal 5 rather than for oil to flow away from the gland seal 5 through the labyrinth 74. It will be understood that the hydrogen-cooled generator 1 includes well-known means (not shown) for circulating the hydrogen within the machine housing 3, and it is to a high-pressure portion of this hydrogen-circulating system that the pipe 75 vents.

While I have illustrated my invention in a preferred form of embodiment, it is to be understood that such illustration is not intended by way of limitation, as various other forms of embodiment may be adopted by those skilled in the art without departing from the essential principles of my invention. I desire, therefore, that the appended claims shall be accorded the broadest construction consistent with their language and the prior art.

I claim as my invention:

1. A hydrogen-cooled machine having an explosion-resistant, substantially hermetically tight, hydrogen-filled housing, a rotatable shaft extending through the housing, a gland seal surrounding said shaft where it extends through said housing, a sump tank for a sealing liquid, means for supplying sealing liquid from said sump tank to said gland seal, and drainage means for returning sealing liquid from both sides of said gland seal to said sump tank, characterized by said drainage means from the hydrogen side of the gland seal including an intermediate settling tank, and limited-opening means for retarding the flow of liquid from said intermediate tank, the amount of liquid normally entrapped in said intermediate tank being so related to its retarded rate of flow that it takes longer, for all of said entrapped liquid to be discharged, than the longest possible duration of excessive pressures as a result of an explosion in the hydrogen-cooled machine.

2. The invention as defined in claim 1, characterized by said intermediate settling tank having a drainage pipe having an inverted gooseneck normally determining the liquid-level of the liquid entrapped in said settling tank, and a limited-orifice means in the top of said inverted gooseneck for normally preventing syphoning through said inverted gooseneck but for permitting syphoning under abnormal pressure conditions.

3. A hydrogen-cooled machine having an explosion-resistant, substantially hermetically tight, hydrogen-filled housing, a rotatable shaft extending through the housing, a gland seal surrounding said shaft where it extends through said housing, a sump tank for a sealing liquid, means for supplying sealing liquid from said sump tank to said gland seal, and drainage means for returning sealing liquid from both sides of said gland seal to said sump tank, characterized by said drainage means from the hydrogen side of the gland seal including a liquid trap and having an intermediate settling tank interposed between said liquid trap and said gland seal, means whereby the hydrogen gaseous pressure normally bypasses around the liquid in said intermediate tank and applies to said liquid seal and whereby, under abnormal pressure conditions, liquid is blown out of said intermediate tank and through said liquid trap into said sump tank; and limited-opening means for retarding said abnormal flow of liquid from said intermediate tank, the amount of liquid normally entrapped in said intermediate tank being so related to its retarded rate of flow under said abnormal pressure conditions that it takes longer, for all of said entrapped liquid to be discharged, than the longest possible duration of excessive pressures as a result of an explosion in the hydrogen-cooled machine.

4. The invention as defined in claim 3, characterized by said intermediate settling tank having a drainage pipe having an inverted gooseneck normally determining the liquid-level of the liquid entrapped in said settling tank, and a limited-orifice means in the top of said inverted gooseneck for normally preventing syphoning through said inverted gooseneck but for permitting syphoning under abnormal pressure conditions.

CHARLES C. STERRETT.